Patented Apr. 11, 1950

2,503,726

UNITED STATES PATENT OFFICE 2,503,726

POLYMERIC POLYHYDRIC ALCOHOLS

Sylvan Owen Greenlee, Louisville, Ky., assignor to Devoe & Raynolds Company, Inc., Louisville, Ky., a corporation of New York No Drawing. Application May 12, 1944,
Serial No. 535,342

9 Claims. (Cl. 260—613)

This invention relates to the production of polymeric polyhydric alcohols and esters thereof and includes improvements both in methods of producing such compounds and in certain of the new compounds so produced.

According to the present invention polymeric polyhydric alcohols are prepared by the reaction of polyhydric phenols with polyepoxy compounds, the coupling portion contributed by the polyhydric phenol and the coupling portion contributed by the polyepoxy compounds occurring as alternating units in the polymeric chain.

The invention is based on the discovery that polyhydric phenols may be treated with polyepoxy compounds to give polymeric polyhydric alcohols and that this method of preparation of polymeric polyhydric alcohols has many advantages from a process standpoint and from the standpoint of the products produced. Polymeric polyhydric alcohols of controlled molecular weight and controlled number of hydroxyl groups per molecule can be readily produced; and these can be esterified advantageously as a continuation of the process by which the alcohols are produced or may be stored for subsequent esterification or other use.

The reactions involved in preparing the polyhydric alcohols are illustrated by the following typical reactions:

1. Reaction of bis-(2,3-epoxypropyl) ether with bis-phenol (p,p'-dihydroxydiphenyl dimethyl methane).

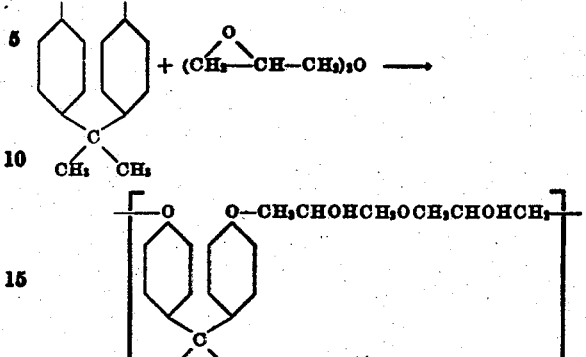

2. Reaction of butylene dioxide with phloroglucinol.

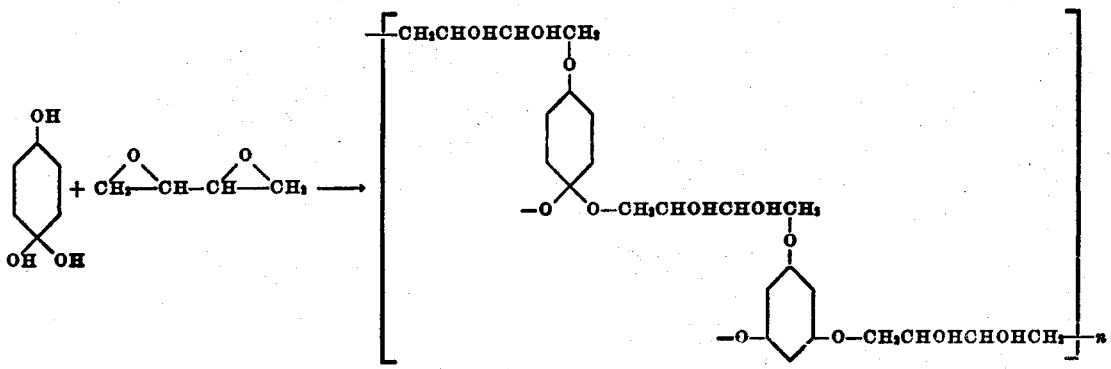

It will be noted that the structure of these polymeric polyhydric alcohols is such that the coupling portion contributed by the polyepoxy compound and the coupling portion contributed by the polyhydric phenol occur as alternating units in the polymeric chain. In the first reaction illustrated, and in similar reactions in which both the reactants are difunctional, the polymer will be a linear polymer. In the second reaction and in other reactions in which either or both of the reactants have a greater functionality than 2, cross-linking may take place and complex tridimensional polymers are formed.

The products of the first reaction in which a diepoxy compound is reacted with a dihydric phenol may be considered to have the following general structure when the reactants are used in equivalent reacting proportions:

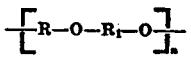

in which R is the residue of the dihydric phenol and $R_1$ the polyepoxy residue and $n$ the degree of polymerization. When diepoxy compounds are used, each diepoxy residue $R_1$ will have 2 hydroxyl groups and the number of hydroxyl groups per molecule will be $2n$.

In general, however, it is undesirable to have free phenolic groups in the resulting product and if an excess of polyepoxy compound is used in regulated amount and without any monofunctional reactant, the formula of the product may be written as follows:

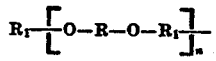

in which the diepoxy residue $R_1$ contains at least two hydroxyl groups. When monofunctional reactants such as monohydric phenols or monoepoxides are used to regulate and control the polymerization, as hereinafter described, the products may be considered to have the following general structure

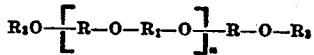

when the dihydric phenol is used in excess, and the following general formula

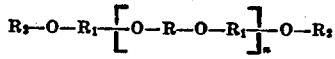

when the diepoxide is used in excess, R being the dihydric phenol residue, $R_1$ the polyepoxide residue, $R_2$ the monohydric phenol residue and $R_3$ the monoepoxide residue and $n$ the degree of polymerization.

In the above reactions the extent of polymerization indicated by $n$ is advantageously regulated and controlled, e. g., to give polymeric polyhydric alcohols of relatively low degrees of polymerization and of regulated and predetermined number of hydroxyl groups per molecule, such that the alcohols are advantageously used for esterification to produce esters thereof.

The reaction of the polyhydric phenols and polyepoxy compounds can readily be accomplished by heating the reactants together for a short time. In general, reaction temperatures of around 50 to 250° C. may be used, the temperature and the time for any given reaction depending on the activity of the reactants. In cases where all of the reactants have boiling points above the reaction temperature, the reaction may be carried out in an ordinary open vessel. In cases where one or more of the reactants used boils at approximately the same temperature as that of the reaction, a reflux condenser is advantageously used; while in cases where a very low boiling reactant is used, such as ethylene oxide as a monofunctional reactant, the reaction is advantageously carried out under pressure.

One of the advantages of the process is that the polyhydric phenols and the polyepoxy compounds react directly without the formation of by-products, such as salts, requiring removal from the reaction product; so that the reaction products can be subsequently esterified without further purification.

Another advantage is that the polymeric polyhydric alcohols produced may be directly subjected to esterification by adding the esterifying acids directly to the hot reaction product and continuing the process at an appropriate temperature to effect the esterification.

Another valuable feature of this method of preparing polymeric polyhydric alcohols is the ease with which the polymerization may be regulated, and may be stopped or started at any stage of the reaction. This is especially advantageous when these alcohols are to be esterified with high molecular weight acids by the application of heat. Heating may be continued after the addition of organic acids without any appreciable further polymerization of the alcohols due to the fact that any unreacted epoxy groups present will be split by the predominantly large amount of carboxyl groups present in the added acid. Thus where an excess of the polyepoxy compound is used to react with the polyhydric phenol, the polyepoxy reactants at the ends of the polymeric chain and still containing unreacted epoxy groups can react with the added fatty acid to form esters, as well as the hydroxyl groups of the polymeric chain.

Another advantage of the process, when a relatively high degree of polymerization is desired, and when e. g., equivalent or approximately equivalent proportions of polyhydroxy phenol and polyepoxy compound are used is that the polymerization can be carried part way and interrupted and the product then used, e. g., for molding purposes, with completion of the reaction in the molding or extruding process. The absence of by-products which require removal or which are objectionable in the final product makes it possible to use the intermediate products without the necessity of separation of by-products before the final molding or hardening operation in which the reaction is completed.

The reaction of the polyhydric phenols and polyepoxy compounds can be carried out without the use of catalysts in most cases. It may be desirable in some cases to use small amounts of acidic or basic catalysts; but these can be used in such small quantities that their content in the product is usually negligible so that it is unnecessary to remove them from the product.

Another advantage of the process is that substantially quantitative yields are obtainable, since all of the difunctional reactants when used in proper proportions are completely taken up in the polymerization reaction. When mono-functional reactants are used to decrease or regulate the degree of polymerization, monoepoxides, such as ethylene oxide or glycidol, etc., are advantageously used, when the polyhydric phenol is used in greater than equivalent proportions with reference to the polyepoxy compound, since such monofunctional reactants are also completely taken up in the polymerization reaction. It is possible to use such compounds as monochlorhydrins in regulating the degree of polymerization of polyepoxides with polyhydric phenols in excess of the equivalent proportions, but this would usually be undesirable.

In producing polymeric polyhydric alcohols to be used for esterification, it is important to regulate and control the polymerization and the number of hydroxyl groups per molecule in the polymeric product. One advantageous method of holding back the degree of polymerization is by using quantities of the reactants other than equivalent quantities. In cases where an excess of one polyfunctional reactant is used, it is often advantageous to use a quantity of monofunctional reactant in an amount equivalent to the excess. When an excess of polyepoxy compound is used, the monofunctional reactant is advantageously a phenol. When an excess of the polyhydric phenol is used the monofunctional reactant is advantageously a monoepoxy compound such as ethylene oxide. Thus bis-phenol can be advantageously reacted with a mixture of butylene dioxide and ethylene oxide; and butylene dioxide can be advantageously reacted with a mixture of bis-phenol and phenol.

With the reactions proceeding approximately to completion under optimum conditions, average molecular weights and average number of hydroxyl groups per molecule of the polymer may be calculated from the quantities of reactants used. These calculations should be approximately correct values for relatively low degrees of polymerization, e. g., from 2 to 20 polymeric units per molecule.

A wide variation in types of products may be made by the present process by variation and selection of the reactants used.

The polyhydric phenols may be mononuclear, as resorcinol, hydroquinone, catechol, phloroglucinol, etc., or polynuclear, such as bis-phenol (p,p'-dihydroxydiphenyl dimethyl methane), p,p'-dihydroxyphenone, p,p'-dihydroxydiphenyl, p,p'-dihydroxydibenzyl, o,p,o',p'-tetrahydroxydiphenyl dimethyl methane, hematoxylin, polyhydric anthracenes, polyhydric naphthalenes, etc. Bis-phenol is particularly advantageous for use in making the new polymeric polyhydric alcohols.

The polyepoxy compounds used are those in which the epoxy groups are of the ethylene oxide type

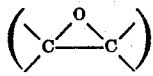

Butylene dioxide and bis-(2,3-epoxypropyl) ether, and the diepoxides of mannitol or sorbitol, are illustrative of the polyepoxy compounds.

Monofunctional reactants are advantageously used for holding back the degree of polymerization. With an excess of polyhydric phenol used with the polyepoxy compound the monofunctional reactant is advantageously a monoepoxy compound such as ethylene oxide, propylene oxide, glycidol, etc. When an excess of the polyepoxy compound is used, the monofunctional reactant is advantageously a monohydric phenol. Monohalides or alkyl sulfates can be used but they are less advantageous in that they form salts as by-products.

From the above reactions it will be seen that the polyepoxy compounds provide a plurality of hydroxyl groups for each molecule of polyepoxy compound reacted. Thus with butylene dioxide, for example, each molecule of butylene dioxide furnishes two hydroxyl groups. Similarly if a monoepoxy compound is used as a monofunctional reactant it will also furnish one or more hydroxyl groups per molecule of monoepoxy compound used. Thus ethylene oxide, for example, will furnish one hydroxyl group.

In making polymeric polyhydric alcohols of predetermined and regulated degree of polymerization and molecular weight and of predetermined and controlled number of hydroxyl groups, the reaction can be controlled by controlling the proportions of reactants used. Thus, if both the polyhydric phenol and polyepoxy compound are difunctional reactants and if the number of mols of one difunctional reactant is X and of the other Y and if X is greater than Y, then the number of mols of a monofunctional reactant to furnish end groups for the polymeric chain will be $2(X-Y)$. The absence of one molecule of a difunctional reactant, or the presence of two molecules of a monofunctional reactant, will break a polymeric chain. The number of recurring polymeric units will then be expressed by the formula $$n = \frac{Y}{X-Y}$$

These relationships may be illustrated by the following examples:

With X mols of hydroquinone and Y mols of butylene dioxide, and with ethylene oxide as the monofunctional reactant, the number of mols of ethylene oxide will be $2(X-Y)$. This may be illustrated by the following equation:

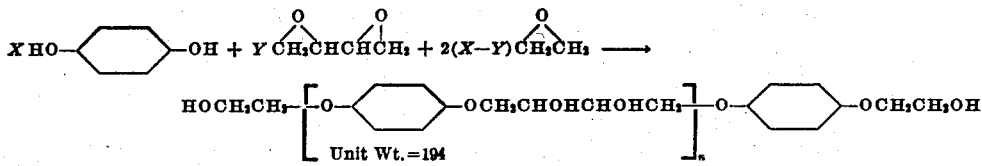

Using 4 mols of hydroquinone with 3 mols of butylene dioxide and 2 mols of ethylene oxide, $n$ will equal 3. The average number of hydroxyl groups per molecule of the product will be two for each butylene dioxide residue and one for each of the two ethylene oxide residues or a total of eight per molecule.

The average molecular weight is $194n$ plus the weight of the end groups. This is $$194 \times 3 + 196 = 778$$

The average equivalent weight to esterification equals the molecular weight divided by the number of OH groups per molecule or 778 divided by 8 or 97.25.

As another illustration, assuming 19 mols of hydroquinone and a desired average value of $n=8.5$. Then $8.5 = Y \div (19-Y)$. $Y = 17$. The number of mols of ethylene oxide to be used $= 2(X-Y) = 4$.

As another illustration, assuming 1 mol of butylene dioxide and 0.93 mol of hydroquinone, and phenol as the end component, then $2(X-Y) = 0.14$ mol of phenol and $n = 13.29$. The average number of hydroxyl groups per molecule $= 2 \times 13.29 + 2 = 28.58$.

The polymeric polyhydric alcohols which have been found particularly advantageous for use in making esters, and particularly high molecular weight unsaturated esters, are those containing from 6 to 15 or 20 or more hydroxyl groups per molecule, the number varying and depending upon the unsaturation of the fatty acids used for esterification, as more fully pointed out in companion application Serial No. 502,317, filed September 14, 1943, now U. S. Patent No. 2,456,408.

The polymeric polyhydric alcohols produced according to the present invention are especially valuable as intermediates in the preparation of complex esters. They may be esterified with monobasic organic acids, polybasic organic acids, resin acids, or combinations of these acids, etc.

The preparation of several polyhydric alcohols is illustrated in the following table:

| | Reactants | Reaction Temp. | Reaction Time | Catalyst | Softening Point in °C. of Product [1] |
|---|---|---|---|---|---|
| | | °C. | Min. | | |
| 1 | 1 mol resorcinol<br>1 mol bis-(2,3-epoxypropyl) ether | 175 | 60 | none | 84 |
| 2 | 1 mol bis-phenol<br>1 mol butylene dioxide | 145 | 30 | ....do.... | 146 |
| 3 | 1 mol bis-phenol<br>1 mol bis-(2,3-epoxypropy) ether | 200 | 30 | ....do.... | 113 |
| 4 | 1 mol bis-phenol<br>1 mol bis-(2,3-epoxypropyl) ether | 175 | 60 | 0.05 mol NaOH | 130 |
| 5 | 1 mol bis-phenol<br>1 mol butylene dioxide | 200 | 60 | none | 200 |
| 6 | 1 mol bis-phenol<br>0.9 mol bis-(epoxypropyl) ether<br>0.2 mol glycidol | 200 | 60 | 0.05 mol NaOH | 91 |
| 7 | 0.9 mol bis-phenol<br>1 mol bis-(epoxypropyl) ether<br>0.2 mol phenol | 200 | 60 | ....do.... | 80 |

[1] Durran's Mercury Method.

One of the advantages of the present invention, previously referred to, is that the esterification can be advantageously combined with the preparation of the polymeric polyhydric alcohol by adding the fatty acids directly to the hot reaction product without the necessity of cooling and isolating and separately handling the alcohols. This is illustrated by the following example, the parts being by weight:

In an apparatus provided with a mechanical stirrer, a thermometer and a condenser was placed 114 parts of bis-phenol and 65 parts of bis-(epoxypropyl) ether. This reaction mixture was heated with stirring at 180–190° C. for three-quarters of an hour. To this reaction mixture was added 209 parts of linseed oil acids. Sufficient mineral spirits was added to obtain constant refluxing during esterification. Esterification was obtained by heating at 250–260° C. for five hours. The acid value of the resulting solids was 7.6. The viscosity of a solution of 50% solids in mineral spirits of kauri butanol solvency of 53 was H (bubble viscosimeter).

Valuable synthetic drying compositions can advantageously be prepared from the polymeric polyhydric alcohols by esterification with unsaturated higher fatty acids. The polymeric polyhydric alcohols of controlled molecular weight and number of hydroxyl groups per molecule may thus be esterified with fatty acids of drying, semi-drying, or even non-drying oils, or mixtures of drying oil and saturated fatty acids, with predetermination and regulation of the effective number of hydroxyl groups per molecule of the polymeric polyhydric alcohol with reference to the degree of unsaturation of the acids used for esterification, as more fully described in Patent No. 2,456,408. Synthetic drying compositions can thus be produced suitable for use as varnishes, etc. and adapted to form insoluble and infusible protective coatings under the influence of air oxidation or heat treatment, as more fully described in said companion application.

I claim:

1. Polymeric polyhydric alcohols having a plurality of alternating aliphatic and aromatic nuclei united through ether oxygen, the aliphatic nuclei containing a plurality of hydroxyl groups, and said alcohols containing from 4 to 40 hydroxyl groups per molecule, said polymeric polyhydric alcohols being solids insoluble in water and having a softening point within the range of about 80° to 200° C.

2. Polymeric polyhydric alcohols as defined in claim 1 having terminal hydroxyl-free aromatic groups.

3. Polymeric polyhydric alcohols as defined in claim 1 having terminal hydroxyl-containing aliphatic groups.

4. Polymeric polyhydric alcohols having a plurality of alternating aliphatic and aromatic nuclei united through ether oxygen, the aliphatic nuclei containing a plurality of hydroxyl groups, and said alcohols containing from 6 to 20 hydroxyl groups per molecule, said polymeric polyhydric alcohols being solids insoluble in water and having a softening point within the range of about 80° to 200° C.

5. Polymeric polyhydric alcohols as defined in claim 4 having terminal hydroxyl-free aromatic groups.

6. Polymeric polyhydric alcohols as defined in claim 4 having terminal hydroxyl-containing aliphatic groups.

7. Polymeric polyhydric alcohols having a plurality of alternating aliphatic nuclei and diphenyl dimethyl methane nuclei united through ether oxygen, said aliphatic nuclei containing a plurality of hydroxyl groups, and said alcohols containing from 6 to 20 hydroxyl groups per molecule, said polymeric polyhydric alcohols being solids insoluble in water and having a softening point within the range of about 80° to 200° C.

8. Polymeric polyhydric alcohols as defined in claim 7 having terminal phenyl groups.

9. Polymeric polyhydric alcohols as defined in claim 7 having terminal hydroxyl-containing aliphatic groups.

SYLVAN OWEN GREENLEE.

(References on following page)

REFERENCES CITED

The following references are of record in the file of this patent:

UNITED STATES PATENTS

| Number | Name | Date |
|---|---|---|
| 1,633,927 | Davidson | June 28, 1927 |
| 2,098,097 | Hopff | Nov. 2, 1937 |
| 2,213,477 | Steindorff | Sept. 3, 1940 |
| 2,233,381 | De Groote | Feb. 25, 1941 |
| 2,280,722 | Schneider | Apr. 21, 1942 |
| 2,282,557 | Bruson | May 12, 1942 |
| 2,285,626 | Taylor | June 9, 1942 |
| 2,327,053 | Marple et al. | Aug. 17, 1943 |
| 2,456,408 | Greenlee | Dec. 14, 1948 |